March 4, 1958 J. W. BATCHELDER 2,825,489
FEEDING MACHINE

Filed June 13, 1952 10 Sheets-Sheet 3

INVENTOR.
JAMES W. BATCHELDER
BY
Albert R. Golrick
ATTORNEYS

March 4, 1958  J. W. BATCHELDER  2,825,489
FEEDING MACHINE

Filed June 13, 1952  10 Sheets-Sheet 4

INVENTOR.
JAMES W. BATCHELDER
BY
Albert R. Golrick
ATTORNEYS

March 4, 1958 J. W. BATCHELDER 2,825,489
FEEDING MACHINE

Filed June 13, 1952 10 Sheets—Sheet 5

INVENTOR.
JAMES W. BATCHELDER
BY Golrick and Golrick
ATTORNEYS

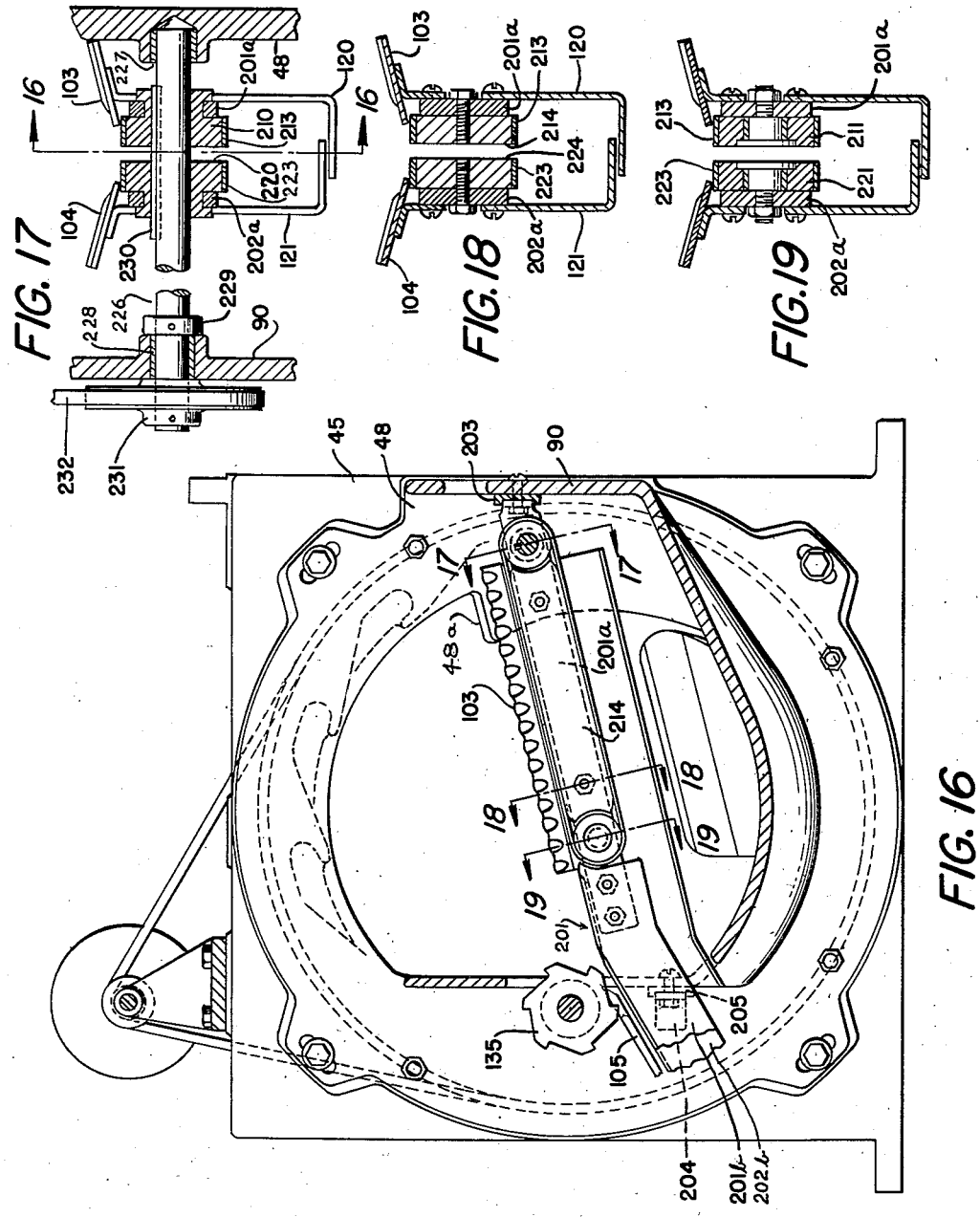

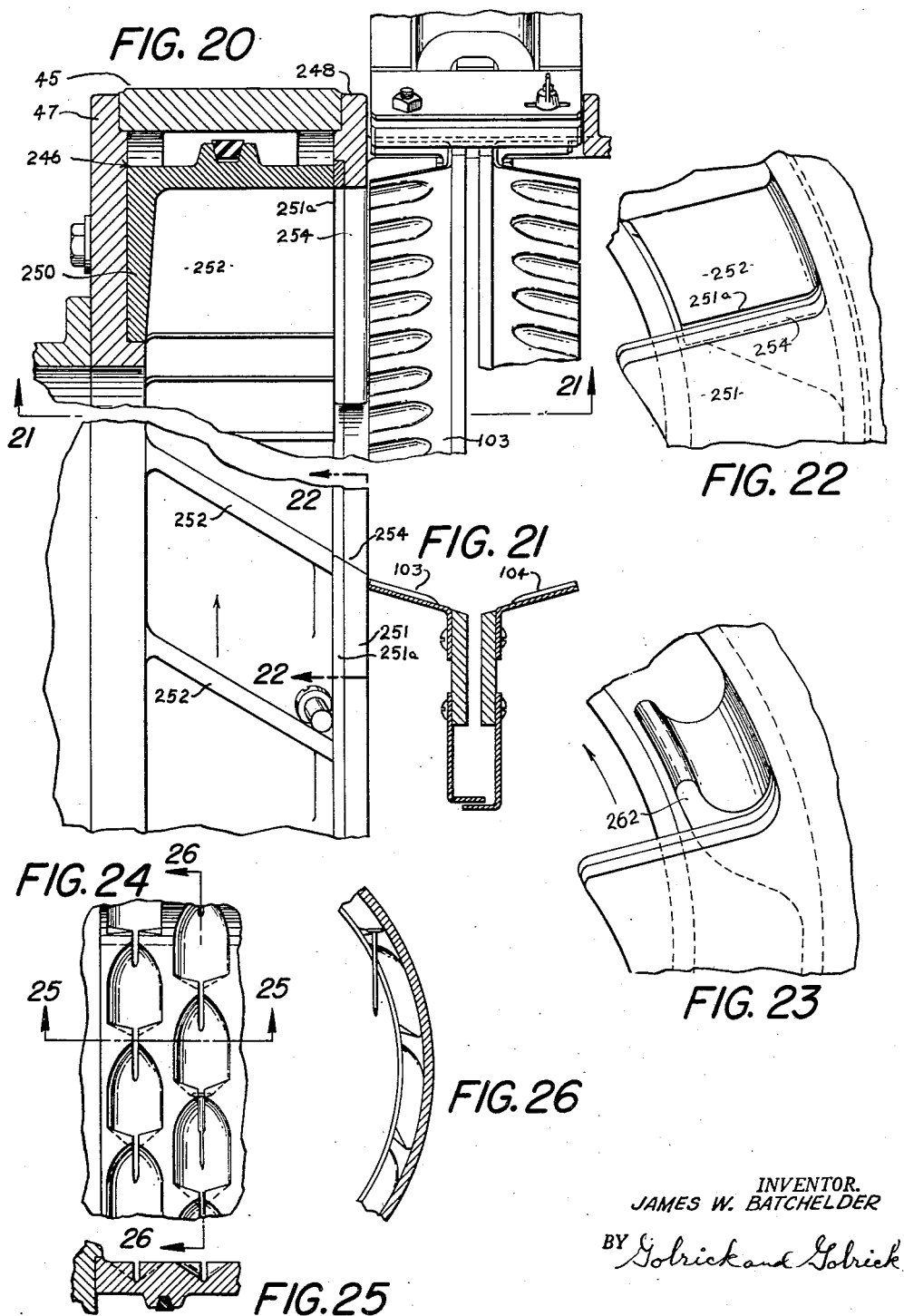

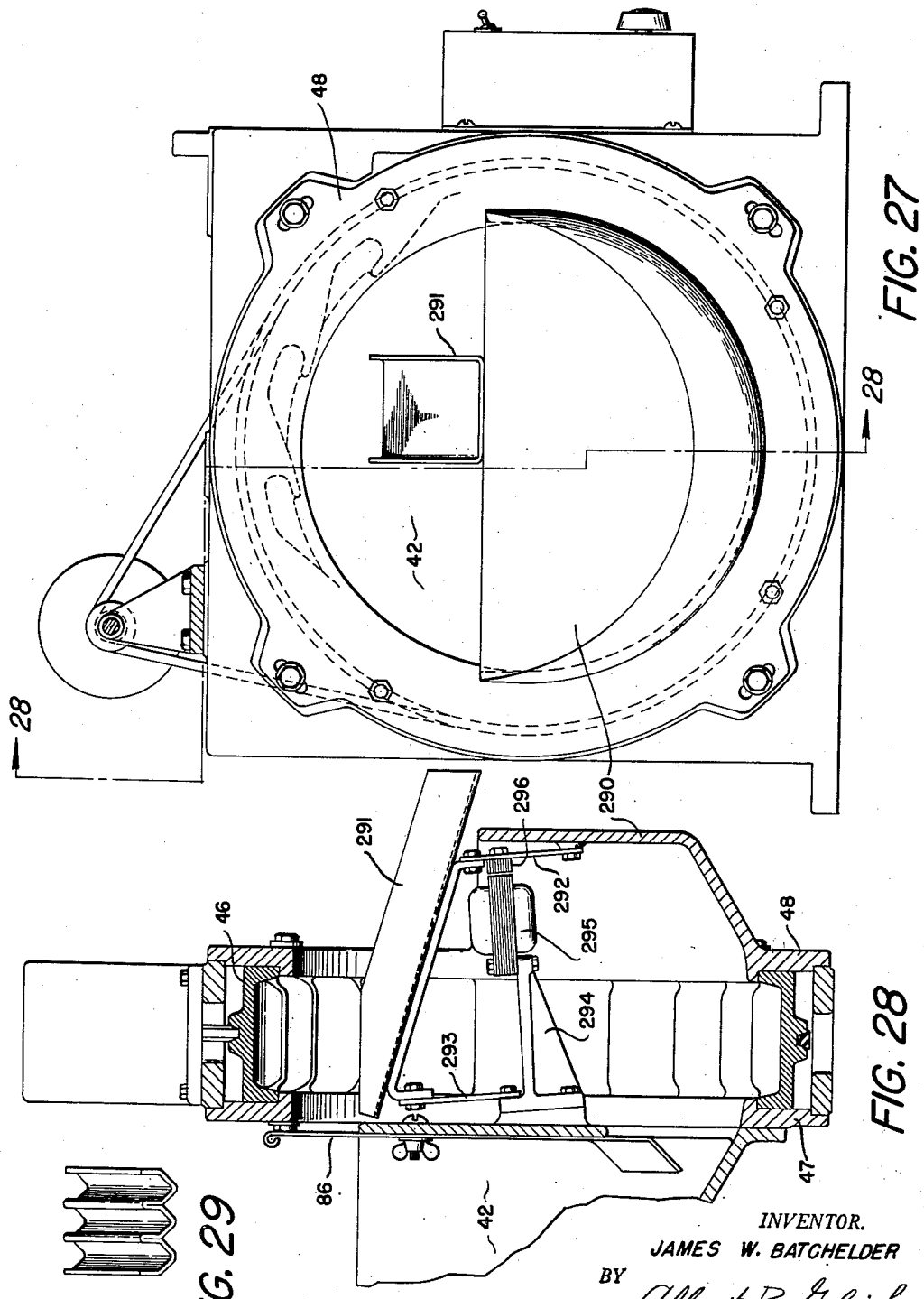

INVENTOR.
JAMES W. BATCHELDER
BY Albert R. Golrick
ATTORNEY

United States Patent Office 2,825,489
Patented Mar. 4, 1958

2,825,489

FEEDING MACHINE

James W. Batchelder, Ascutney, Vt., assignor, by mesne assignments, to Batchelder Engineering Co., Inc., Springfield, Vt., a corporation of Vermont Application June 13, 1952, Serial No. 293,303

9 Claims. (Cl. 221—160)

This invention relates to improvements in automatic feeding machines, and in particular to feeding machines of the type whereby screws, nails, nuts, rivets or other such work pieces or blanks therefor are fed individually through a feeder discharge track to counting, slotting, or thread rolling machines or the like.

Track type feeding machines usually include a hopper into which work pieces are loaded in bulk, a slotted feed track or channel to align the work pieces and to discharge them individually and in definite orientation to a machine being fed, means on the feed track for guiding the work pieces into the slot in proper position, and a transfer mechanism whereby the work pieces are delivered from the hopper to the feed track guides at a controlled rate. Such machines of the prior art have been afflicted with various disadvantages such as jamming of work pieces in moving parts of the transfer mechanism, undue wear of such moving parts by the work pieces or metallic debris accompanying the work pieces, and limitation of feeding rates due to escape of work pieces delivered to the track guides or due to mutual interference of work pieces at the guides. Further, the adjustments and changes required in the machine for handling various sizes and shapes of work pieces have not been readily effected in such machines.

Hence, an object of the present invention is the provision of a feeder machine wherein jamming and wear of the transfer mechanism is avoided. Another object is the provision in a feeder machine of a feed track mechanism including work piece guides adapted to handle work pieces at high feed rates. Another object is the provision of a feeding machine adapted to feed various types and sizes of work pieces. Other objects and advantages of the invention will appear from the following description and the drawings, wherein—

Fig. 6 is a detail of the feed hopper outlet in section taken at 6—6 in Fig. 1;

Figure 1:
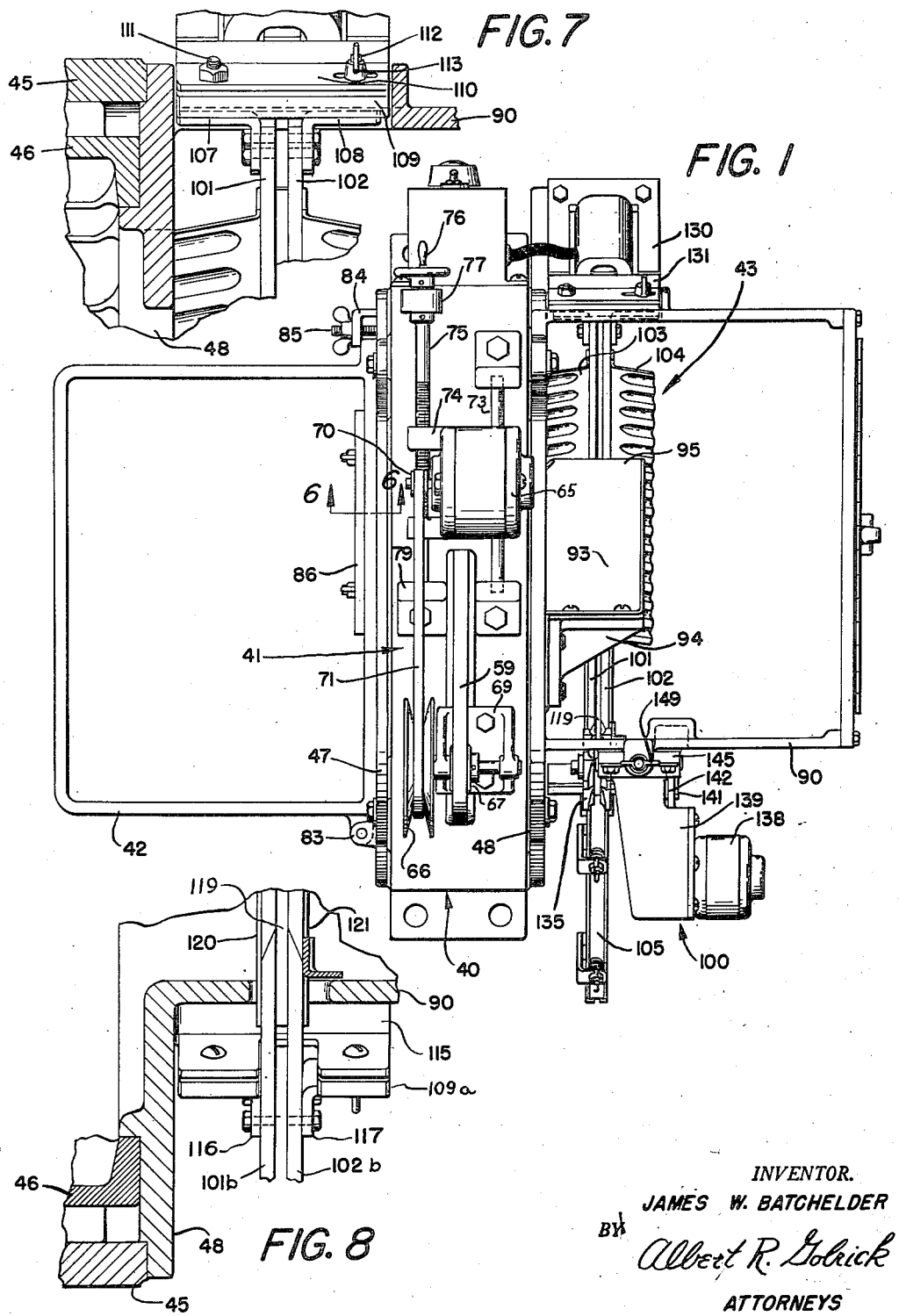
Fig. 1 is a plan view of the machine with the driving mechanism shield removed.
Figure 2:
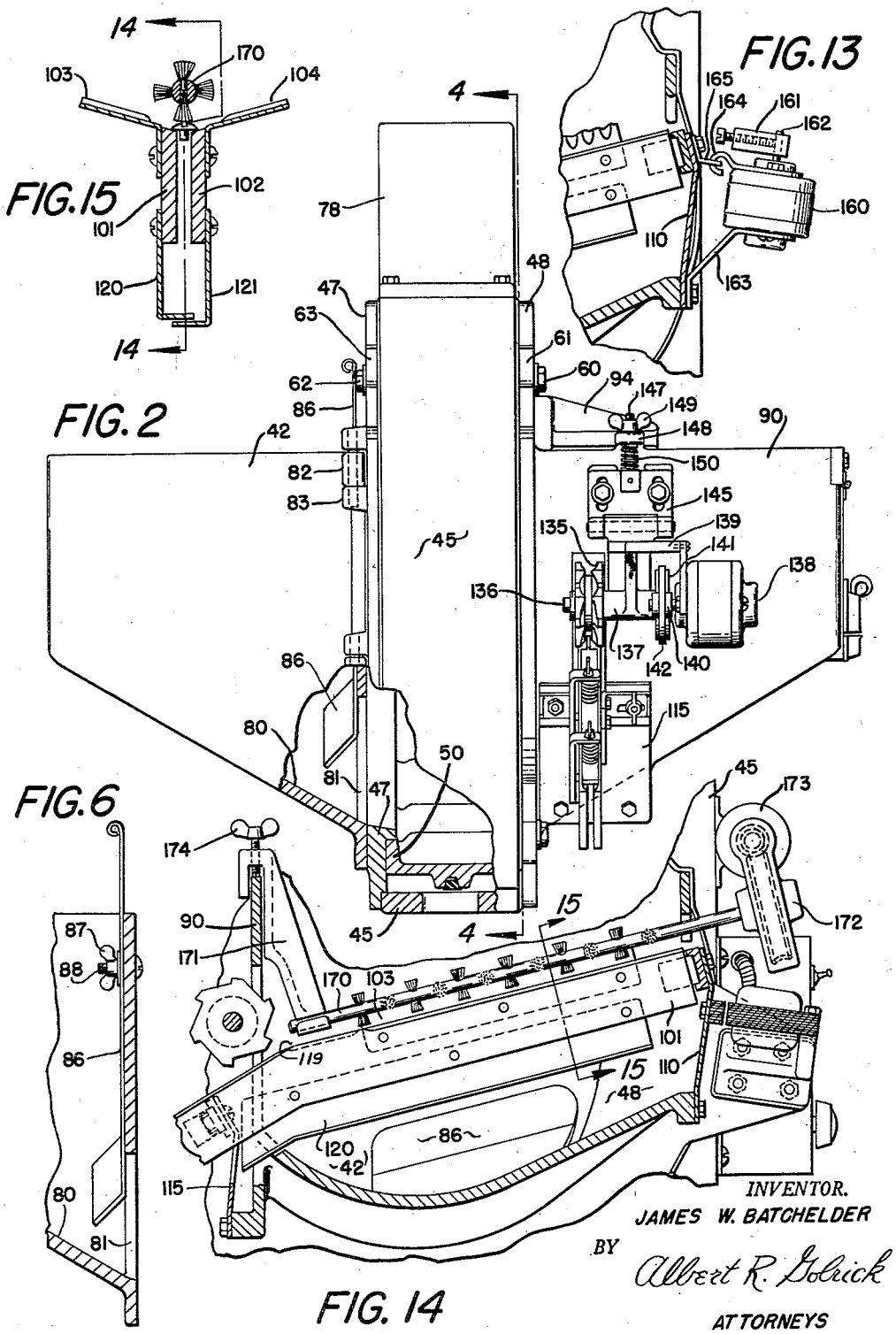
Fig. 2 is an elevation view of the discharge end of the machine.
Figure 3:
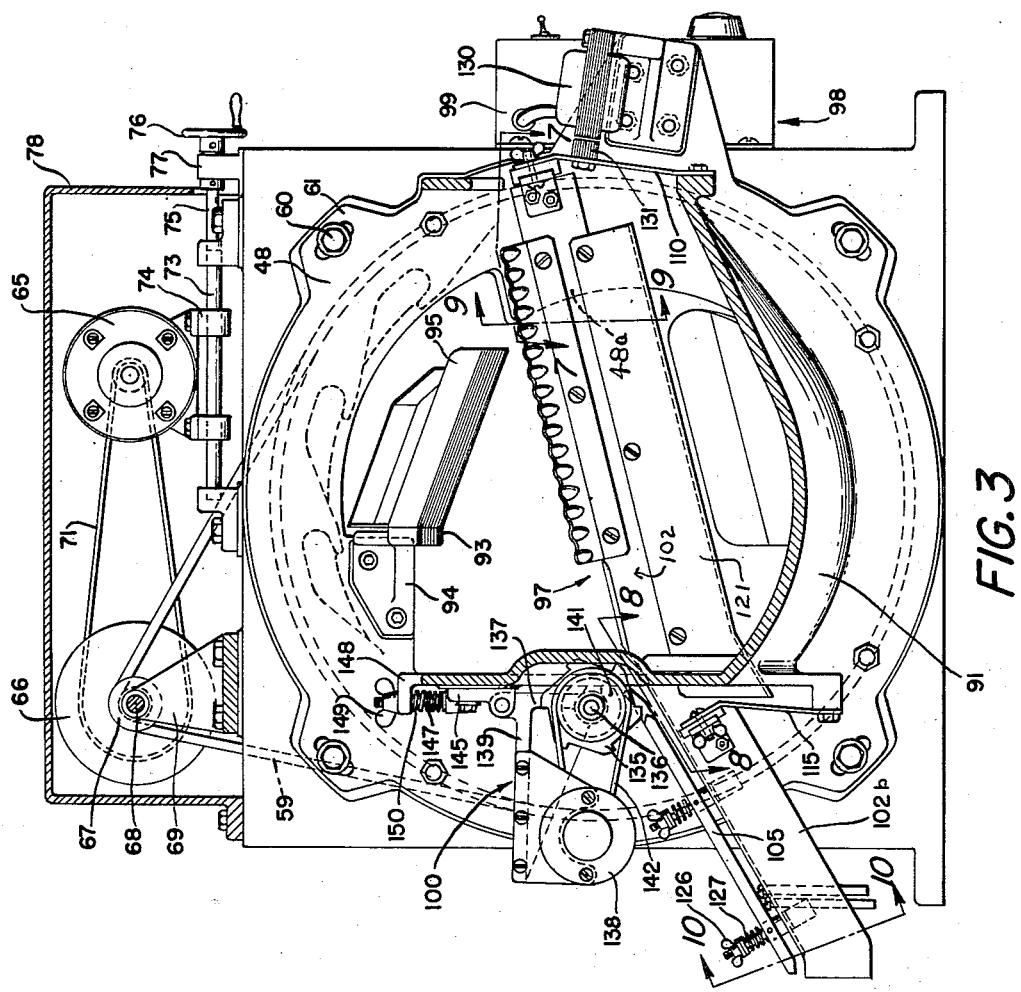
Fig. 3 is a side elevation of the machine of this invention with certain parts broken away to show the operating mechanism more clearly.
Figure 4:
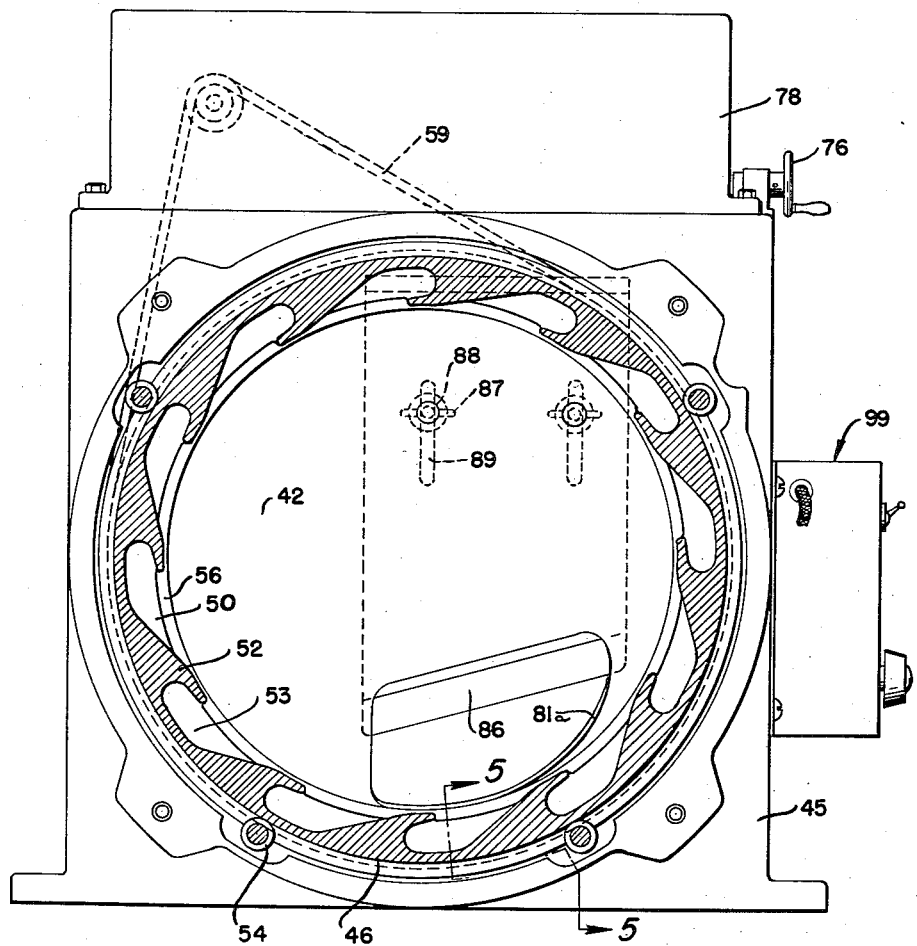
Fig. 4 is a sectional view taken along the line 4—4 in Fig. 2.
Figure 9:
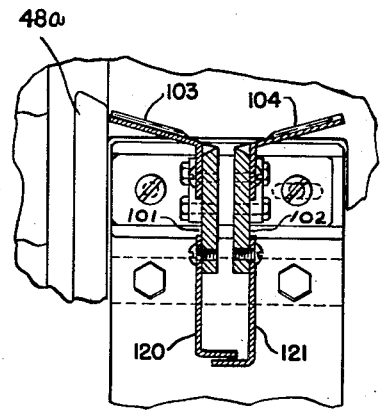
Figure 10:
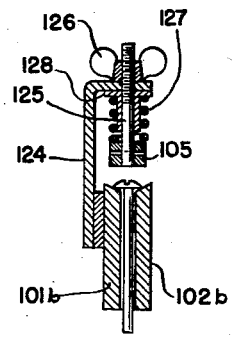
Figure 11:
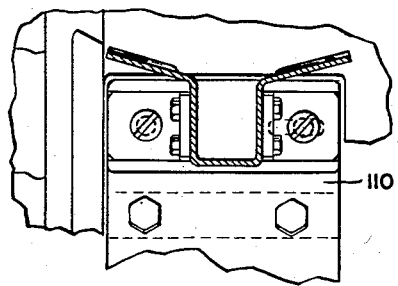
Figure 12:
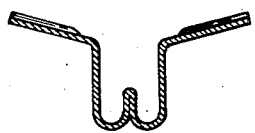
Figure 30:
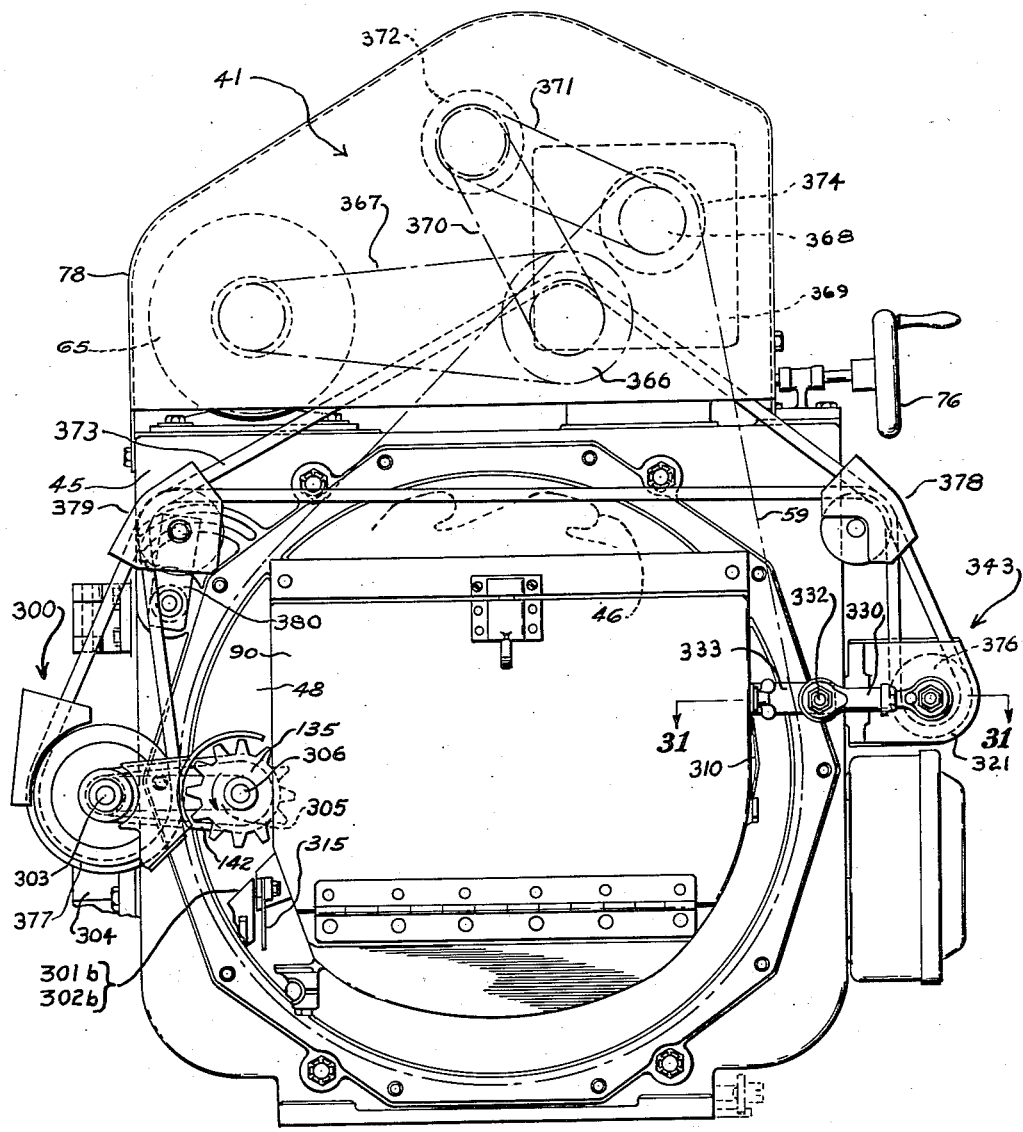
Figure 31:
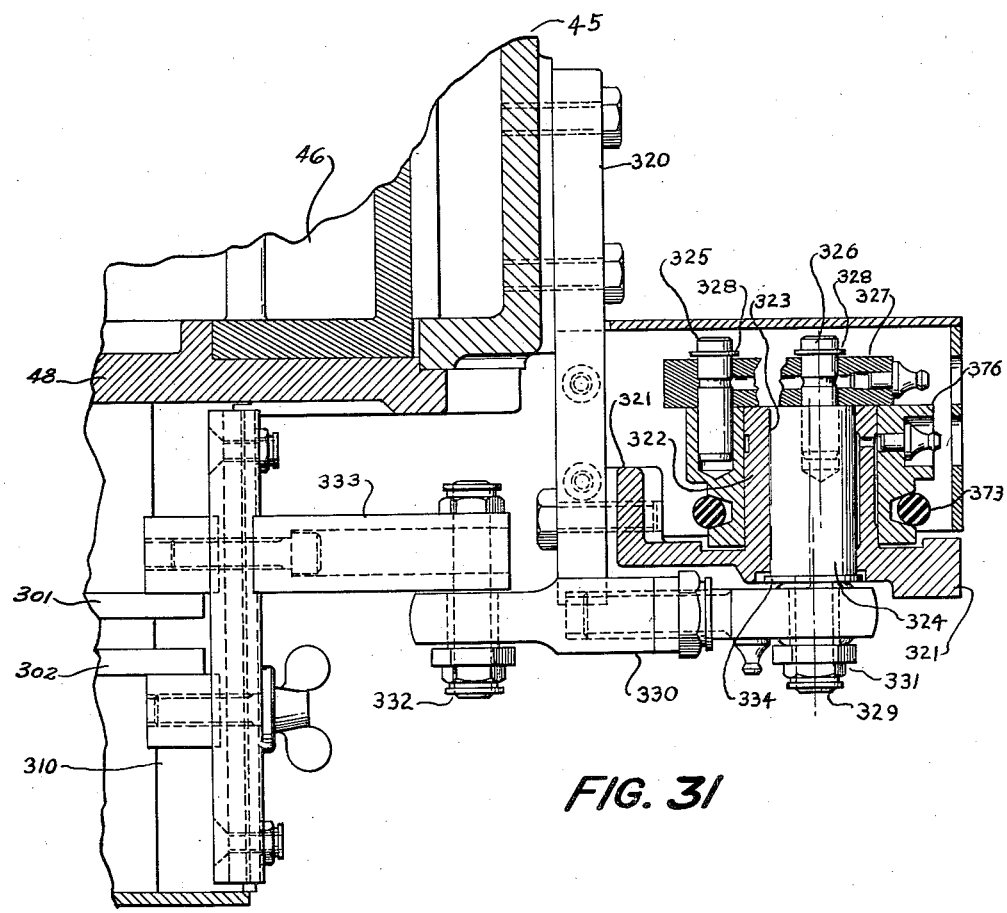

Figs. 7 and 8 are fragmentary sections taken at the lines 7—7 and 8—8 in Fig. 3 to show in detail the manner of mounting the feed tracks for adjustable spacing;

Fig. 9 is a sectional detail taken at the line 9—9 in Fig. 3 showing details of the feed track structure;

Fig. 10 is a section of the discharge portion of the feed tracks taken at the line 10—10 in Fig. 3;

Fig. 11 is similar to Fig. 9, but shows the use of a second form of feed track interchangeable with other forms in the machine;

Fig. 12 is a third form of interchangeable baffled feed track;

Fig. 13 is a detail showing a modification of the vibrating feed track actuating means;

Fig. 14 shows the use of a revolving brush attachment on the machine for feeding top-heavy nuts or similar items;

Fig. 15 is a sectional detail of the brush attachment taken substantially along the line 15—15 in Fig. 14;

Fig. 16 is a side view similar to Fig. 3 showing the arrangement of a conveyor belt type feed track with certain parts broken away or omitted which are not necessary for disclosure of the structure;

Figs. 17, 18 and 19 are fragmentary details taken in section in Fig. 16 along the lines 17—17, 18—18 and 19—19 to show details of the conveyor belt mounting and driving structure;

Fig. 20 is a fragmentary view showing the second form of lift ring;

Fig. 21 is a fragmentary view taken along the line 21—21 in Fig. 20;

Fig. 22 is a fragmentary side view of the ring of Figs. 20 and 21;

Fig. 23, similar to Fig. 22, shows a modification of the lift ring of Figures 20–22;

Fig. 24 is a fragmentary view showing the inner surface of a third form of lift ring for handling nails;

Figs. 25 and 26 are sectional details of Fig. 24 taken along the lines 25—25 and 26—26 therein;

Fig. 27 is a side elevation of the machine adapted for feeding items without individual orientation;

Fig. 28 is a fragmentary view partially in section taken along the lines 28—28;

Fig. 29 is a fragmentary perspective view of a modification of the vibrating feed trough shown in Fig. 28;

Fig. 30 is a side view of a feeder having a belt driven eccentric type track actuating unit; and Fig. 31 is a detail view of the actuating unit, taken partly in section along the line 31—31 in Fig. 30.

Figure 5:
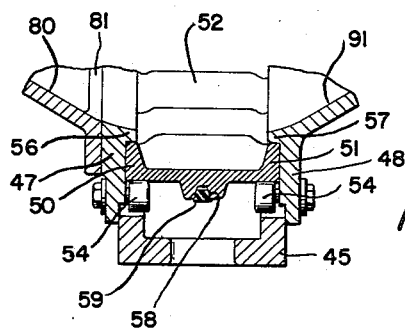
Fig. 5 is a detail sectional view taken along the staggered line 5—5 in Fig. 4 to show the manner of mounting the lifting ring in the frame.

In the high speed automatic hopper feed machine shown in Figs. 1 to 4, a lifting ring unit 40 powered by a driving mechanism 41 transports work pieces, charged in bulk to hopper 42, from the hopper to an aligning feed mechanism 43, which delivers the work pieces individually and in definite orientation at its discharge end for presentation to a machine being fed thereby. The lifting ring unit 40 comprises a hollow square member 45 having a large circular opening in each of the two opposite square faces and annular end plates 47, 48 bolted respectively to the hopper and discharge sides of the member 45 to form therewith a lifting ring housing for the open end lifting ring 46. As may be seen more clearly in Figs. 4 and 5, the lifting ring 46 has a channel shaped cross section providing inwardly projecting end flanges 50, 51 forming with partitions 52 a plurality of lifting pockets 53 spaced about the inner circumference of the ring. To avoid a central shaft and spider supports extending to the ring, which usually interfere with the movement of work pieces, the ring is rotatably supported between the end plates 47, 48 by two of the housing sets of trunnion rollers 54 bearing on its outer cylindrical surface, each set being mounted to the inner surface of the corresponding end plate. The ring end flanges 50, 51 are provided to prevent jamming of work pieces against the stationary end plates 47, 48 and also to prevent abrasion of the plates by the parts carried in the rotating lift ring. Further protection is afforded by the shroud flanges 56 and 57, on the plates 47 and 48 respectively, extending inwardly over the flanges 50, 51 to prevent chips and other debris from entering between the end plates and ring and there causing wear.

The lifting ring is provided on its outer circumference with a central groove 58 to receive a V-belt 59 extending through openings in the frame from the driving mechanism 41. The end plate 48 is secured to the frame member 45 by bolts 60 passed through the slotted ears 61 into the frame member. The plate 47 is similarly secured to the frame by bolts 62 passed through the ears 63, whereby the end plates may be readily removed and replaced for changing the lifting ring. To prevent work pieces in the lift compartments from projecting through the plane of the opening in end plate 48 and possibly catching under part of track assembly 97, an inward guard extension 48a terminating above the track assembly and having a spiral inwardly receding edge, is provided on plate 48 adjacent the upper end of the track assembly.

The driving unit 41 (Figs. 1 and 3) comprises a motor 65, a pair of pulleys 66 and 67 keyed to a shaft 68 journaled in a bracket 69 fixed to the top of the frame 45, the motor pulley 70 through V-belt 71 driving 66, and hence 67 which is connected to the lift ring by V-belt 59. Preferably, pulleys 66 and 70 are variable pitch V-belt pulleys for speed range control or they may be removable, so that by changing them the speed of the lifting ring may be varied. To effect speed control with variable pitch pulleys, or to facilitate changing the pulleys, the motor 65 is movably mounted for adjustment toward and away from the pulley bracket 69 by a carriage 74 riding on rod 73 and engaging an adjusting screw 75, rotatable by hand wheel 76 in journal brackets 77, 79 on the frame 45. Other types of speed control may, of course, be used. The entire driving mechanism is enclosed by a shield 78 bolted to the top of the frame 45.

The hopper unit 42, open at the top and having bottom 80 slanted to a lateral opening 81 to discharge to the lifting ring, is hinged to the annular plate 47 at one end by hinge members 82, 83 and at the other end is held in closed position against the plate by locking nut and lug 84 and plate stud 85. To control the flow of work pieces through opening 81 to the lift ring, a plate 86 slidably mounted to the hopper wall is secured in adjusted position by wing nuts 87 on the bolts 88 extending through the hopper wall and the vertical plate slots 89. The edge 81a of the opening 81, toward the ascending side of the lift ring, recedes in spiral form from the lift ring to merge into the top edge of the opening, whereby any work pieces projecting from the lift ring are prevented from catching beneath the top edge of the opening.

Extending laterally from and integral with the plate 48 is a hopper-like enclosure 90 forming a housing and mounting for the feed track mechanism 43, the bottom 91 of which is curved or sloped downwardly towards the opening of the annular ring 48 to return to the lifting ring work pieces rejected or escaping from the feeding mechanism. To receive work pieces dropped from the compartments 53 of the lifting ring at the uppermost position thereof and deliver them to the feed mechanism, a chute 93 is provided in the form of a flanged tray member mounted by a bracket 94 to the upper portion of the annular plate 48 and extending substantially across the width of the frame 45 and of the feed track assembly 97. The chute is slanted downwardly and to one side to bring the discharge opening 95 near to the upper end of the feed track.

The feed mechanism 43, the general disposition of which may best be seen in Fig. 3, comprises the feed track assembly 97 extending parallel to the plane of rotation of the lift ring through openings in the housing 90 and mounted thereto for endwise vibration, an electromagnetic track actuating unit 98 including an electric control unit 99, and a rejector mechanism 100 for removing misaligned work pieces from the track. The feed track mechanism and mounting structure, shown in detail in Figs. 7 to 9, comprise a pair of parallel bars 101 and 102 spaced to provide a feed slot to accommodate and align work pieces and having wings or baffles 103, 104 respectively, affixed on the upper portion thereof beneath the chute 93 to direct work pieces into the slot. Preferably these baffles are corrugated rather than flat. Within the enclosure 90 the inclination of the feed track is of such a magnitude as will permit downward movement of work pieces when the track is vibrated endwise, as hereinafter described, but not to allow free sliding when the track is stationary. A track inclination from 0° up to about 20° generally may be used. The slope of the feed track outside the enclosure, that is, of lower reaches 101b and 102b may be greater and a holding bar 105 is mounted thereabove to control the movement of the work pieces by retaining them on the track and preventing the heads thereof from overlapping. Preferably the top surfaces of the bars are beveled inwardly along the lower or discharge portions 101b, 102b (see Fig. 10). This increased slope is preferable where the feeder is used with a photocell counter, since it causes spacing to develop between work pieces, thereby allowing a more accurate count.

The feed track assembly 97 is suspended at its upper and lower ends for endwise oscillation by spring plates 110, 115 each bolted to the housing 90. Right angle bracket pieces 107, 108 affixed by one leg to the track bars 101, 102 respectively, have the other legs fitted within the groove of a channel piece 109 secured transversely at the upper end of spring plate 110. A bolt 111 passed through bracket 107, channel 109 and spring 110 holds the bar 101 at a fixed spacing from the annular plate 48, while the bolt 112 with wing nut 113 passed through bracket 108 and through the aligned slots in channel 109 and the spring plate holds the bar 102 in adjusted position (see Fig. 7). To a second spring plate 115 the lower portions of the track bars are mounted in a similar manner by means of brackets 116, 117 secured to the sides of the bars, the bracket 117 on bar 102 being slotted and held in adjusted position between the channel members of 109a by a bolt and wing nut (see Fig. 8). The channel members 109 and 109a form slideways for the brackets 108 and 117 of the movable bar 102.

Fig. 9 shows the disposition and mounting of the wings or guide baffles 103, 104 to the track bars. These baffles are provided with corrugations which hinder movement of the work pieces lengthwise of the baffles, direct them towards the slot and with the endwise oscillation of the track assembly hereinafter described, serve to separate and disentangle work pieces delivered from the chute 93. These baffles are sloped inwardly to guide work pieces toward the track slot, the angle of flare or slope toward the slot being preferably about 15° so that the work pieces roll toward the track slot but do not slide lengthwise thereof. Ricocheting of work pieces from the track mechanism when dropped thereon from chute 93, which usually causes escape from the track mechanism and which cannot be overcome by increasing the lifting rate due to mutual interference of excess work pieces on the baffles, is minimized by use of the baffle and track angles described. Hence a high percentage of work pieces delivered by the lifting ring find the track slot, so that maximum feed rate is increased.

Skirts 120 and 121 with overlapping bottom flanges are secured along the bottom edges of the track bars to provide a trough-like shield for the lower ends of work pieces feeding down the track mechanism to prevent interference by work pieces in the enclosure 90. Also, since the lower ends of the skirts open through the wall of housing 90, any debris delivered with work pieces to the track is discharged outside the housing, so that the skirts have the further function of continuously removing abrasive foreign material from the machine. The brackets 124 on the bar 101 (see Fig. 10) suspend the holding bar 105 by studs 125 extending upwardly from the bar through each bracket 124 and held by means of the wing nuts 126 to provide for height adjustment of the bar, a coil spring 127 being disposed between the bracket and the holding bar. Preferably a collar 128 having a flanged end bearing on the bracket 124 is disposed about the stud 125 within the coil spring to steady the bar.

The actuating mechanism for the track comprises an electromagnet 130 mounted by a bracket to the end plate 48 and an armature bar 131 bolted to the spring plate 110. The motion induced by the actuating mechanism differs from that utilized in many feed tracks to overcome static friction, for when the armature is attracted by the electromagnet the track assembly 97 is drawn sharply in an endwise direction against the resisting force of the springs 110, 115, and when released, the springs move the track mechanism back at a relatively slower rate and acceleration. Due to the blade spring mounting of the track, and also—where the track is sloped as shown in the drawings—due to the downward inclination, each sharp retraction of the track by the electromagnet in combination with the effect of work piece inertia causes a relative movement of the track downwardly and rearwardly away from the work pieces, thereby allowing the work pieces to drop back to the track at new positions advanced in the feed direction before the opposite spring induced movement of the track is effected, so that with rapid vibration the parts move quickly down the track. The control unit 99 may contain a suitable timing device or circuit to supply a timed interrupted electric current to the electromagnet, a control switch and rheostat or other control means whereby the current to the electromagnet is regulated to determine the amplitude of endwise oscillation of the track assembly.

The rejector mechanism assembly 100, serving to cast from the track into the housing 90 those work pieces which are not properly aligned in the slot, comprises a circumferentially slotted and notched kicker wheel 135 rotating with a pulley shaft 136 journaled in arm 137 of a right angle bracket plate and an electric motor 138 mounted on the other arm 139 of the bracket for driving the wheel through motor pulley 140, pulley 141 on shaft 136 and pulley belt 142. The bracket plate is pivoted near its apex to a block 145 slidably mounted to the outside of housing 90 by a bolt and slot connection. Close adjustment of the height of the kicker wheel relative to the track is provided by stud 147 on the upper end of the block 145 extending through a perforated lug 148 on the housing 90, the stud and block being raised and lowered by a wing nut 149. Preferably a spiral spring 150 is interposed between the sliding block 145 and the lug 148 to urge the entire assembly downwardly. The upper end of holding bar 105 may be formed into a tongue projecting into the circumferential groove of the rejector wheel 135, so that no gap occurs between the wheel and the bar wherein work pieces might become malpositioned.

By beveling the top surface of track bars 101, 102 outwardly between the end of the baffles and the wheel 135, the majority of those work pieces, tending to ride athwart the top of the track, are caused to drop off the track to the bottom of enclosing hopper 90 for return to the left ring, thereby decreasing the load on the rejector wheel. With the lower or discharge reaches of the track bars more sharply inclined than the upper reaches, and with the apex or hump 19 formed at the junction of the two reaches disposed adjacent to and just in front of the rejector wheel, such work pieces, as by reason of proportion might pass the wheel on a straight track even though not suspended in the slot, are brought into contact with the wheel and rejected in passing over the apex portion of the track.

In operation, the lifting ring picks up work pieces flowing from the hopper through the opening 81 and carries them upwardly to a position above the chute 93 where they are released to the chute as the compartments 53 swing into an inverted position. The work pieces sliding down the chute discharge upon the corrugated baffles or wings 103, 104 and under the described vibrating motion of the mechanism 98 are separated and worked into the slot between the bars. Any work pieces which escape from the track or baffles are carried by the bottom slope of the enclosure back to the lifting ring. The heads of screws, nails or other such work pieces bearing on the top beveled edges of the bars, suspend the body of the work pieces between the slots in serially aligned relation as the vibrating action carries the work pieces down towards the kicker wheel under which the heads pass when the pieces are properly suspended to feed into the lower external end portion of the feed track beneath the holding bar 105. Any work pieces which travel down the track in any but properly suspended position either fall off the beveled top before reaching kicker wheel 135 or are rejected by the wheel and tossed inwardly into the enclosure to return to the lifting wheel.

The feeder machine may be adapted to a double discharge feed by utilizing the hopper 42 to mount a second feed track, feed track actuating assembly, and rejector mechanism. In that case the chute 93 would be provided with a second discharge portion 95 extending over the second feed track assembly, and if desired the enclosure 90 may be modified in form to serve as a second hopper including a sliding plate structure for the control of hopper discharge as previously described for plate 86 on hopper 42.

Figs. 11 and 12 show trough-like track units which may replace the previously discussed parallel bar track form for handling unheaded work pieces which must be supported by the track bottom. Thus, for example, the form in Fig. 11 is adapted to feeding nuts of a given size, the width of the trough, which is integral with the baffles, being selected to correspond to the thickness of the nut. Likewise it may be used for bulk delivery of small pieces, as to a weighing machine or the like. The trough unit shown in Fig. 12 with a longitudinal partition provides two feed channels in the one track. This form is of advantage where the feeder is being used for packaging work pieces, especially headless work pieces, by count rather than by weight in conjunction with a photoelectric counting device actuating a feed track discharge cut-off gate, for two streams of work pieces may be counted simultaneously thereby utilizing more fully the capacity of the machine.

A second form of actuating unit for producing endwise vibration of the track is shown in Fig. 13, wherein an electric motor 160, carrying an eccentric weight 161 on its vertically disposed shaft 162, is mounted at its bottom end on a plate spring bracket 163 for movement in the plane of vibration of the track under the reactive forces developed by the weight during rotation. By hook 164 on the motor casing and an eye plate 165 secured to the upper end of track suspension spring 110, the track is linked to the motor to oscillate therewith. Predetermined looseness between hook 164 and the eye opening in plate 165 produces the advantageous quick movement of the track toward the motor 160 at each revolution thereof. The lost motion prevents the motor from pushing the tracks on its return stroke, allowing return by the restoring force of the spring plates 110 and 115.

In Fig. 14 the feeding mechanism 43 is shown adapted to handle short shank bolts, screws, rivets or other top-heavy headed work pieces. A revolving brush 170, mounted roughly parallel to the feed track in line with the feed track slot, is supported at one end by a bracket 117 hooked over the wall of housing 90 and at the other end in a speed reduction unit 172 pivotally mounted to the casing of driving motor 173 which is mounted at the end of frame 45. A bolt, 174, threaded through bracket 171 to bear on the top edge of the housing wall over which the bracket is hooked, provides a brush height adjustment for the accommodation of various work piece sizes. The brush bristles are grouped in tufts to allow the work pieces access from the guide baffles to the track and to prevent the brush from dragging a great number of work pieces beneath itself and causing possible jamming. The described manner of supporting the brush permits it to rise in the event too many pieces are delivered to the baffles. As shown in Fig. 15, a work piece properly suspended by its head on the beveled top edges of the tracks 101, 102 is just cleared by the revolving brush. However, in the case of work pieces riding in the track slot with the head turned edge up or in some other manner misaligned, the brush comes into contact with a projecting portion of the work piece, sweeping it either entirely from the track or part way up the flared slope of baffle 103 whence it may roll back to the track.

In Figs. 16 to 19, wherein the elements of the machine not necessary for the description of the feed track are omitted, there is shown a conveyor belt type feeding mechanism. The track assembly comprises two similarly spaced parallel tracks comprised of elements 102a, b and 202a, b, disposed relative to the machine frame and end plate 48 in a manner similar to that of the previously described vibratory feed track. Of these, the track 201 is fixed relative to the end plate 48 and the other is adjustable in position to change the slot width. Both tracks have the structure shown in Fig. 16 for the track 201, including a conveyor mounting bar 201a within the housing 90, having one end bent inwardly and secured within the flanges of transverse channel 203 disposed on the wall of housing 90 and the other end attached to a discharge portion 201b, extending through housing 90 beneath the rejector wheel 135 and secured to the bracket 204, having one end secured in channel 205 affixed to the housing. The second track is constituted of like elements 202a, b adjustable secured in channels 203, 205 by bolt and slot structures to allow spacing variation. A holding bar 105 may be mounted to the fixed member 201b by a structure similar to that shown in Fig. 10.

On the inner side of bar 201a, a driving wheel 210 at the upper end and idler wheel 211 at the lower end carry a conveyor belt 213, the upper reach of which is supported by plate 214 secured to the bar 201a. On the inner side of 202a are mounted corresponding driving wheel 220, idler 221, belt 223 and belt supporting plate 224. The driving wheels are journalled in the bars 201a, 202a in a manner preventing axial displacement. Corrugated baffles 103, 104 are disposed along the upper sides of bars 201a, 202a with the inner edges thereof overlapping belts 213 and 223, whereby work pieces are directed into the slots between the belts in the manner previously described for the vibrating type tracks. Skirts 120 and 121 with overlapping bottom flanges are disposed on the bottom of the bars 201a and 202a. The belt drive shaft 226, journaled in inner and outer bushings 227 and 228 pressed into suitable apertures in the annular end plate 48 and wall of housing 90, is held in axial position by a collar 229 and is keyed to the driving wheels 210, 220. The driving wheels are slip fitted to the shaft and key 230 to permit axial sliding of the tracks in varying the track slot opening for various sizes of work pieces. A pulley 231 on the outer end of the shaft is driven through belt 232 by an electric motor (not shown) mounted on the outside of housing 90.

Preferably, speed control means for the conveyor type track should be provided in the form either of a motor speed control or a variable speed transmission. Parts delivered to the baffles 103, 104 are directed thereby downwardly to the conveyor belt slot where they are suspended by the heads on the belts. The suspended parts are carried by the belts to the stationary discharge tracks 201b, 202b, the ends of which are in close proximity to the idler wheels 211, 221 and in alignment with the corresponding belts. Work pieces are pushed ahead in series on the stationary tracks, as each additional work piece is fed onto the track by the belts, to pass out under the rejector wheel 135 to the discharge end of the track.

In Figs. 20 to 26 inclusive three additional lifting ring forms are shown which may be used in handling various types of work pieces. The lift ring structure 246 shown in Figs. 20 to 22 has a flange 250 similar to flange 50 adjacent to annular end plate 47, but the second flange 51 appearing in 46 is omitted, resulting in an L-shaped ring cross section. Hence the lift ring compartments formed by blades or partitions 252 are open on the side adjacent to annular end plate 248. On the ascending side of the lift ring, the open ends of the compartments are closed by a radially inwardly projecting portion 251 on the end plate structure 248 terminating at an upper edge 254 disposed slightly above the upper end of track baffle 103. Preferably, a hardened bearing ring insert 251a for the open end of ring 246 is disposed in a recess in the inner face of the end plate 248. The partitions 252 are disposed so that, when on the ascending side of the ring, they slant downwardly toward the open end of the compartments, allowing escape of work pieces to the track as each compartment rises above the upper edge 254 of the projecting portion of the end plate 248. With this structure the discharge chute 93 appearing in Figs. 1 to 4 is of course unnecessary.

In Fig. 23 a ring structure is shown which discharges in a manner similar to that of Figs. 20–22. The blades or partitions 262, however, are shaped similarly to those of the first-described ring structure to provide compartments having semi-cylindrical bottoms slanted for discharge over edge 254 of the end plate 248.

Where it is found desirable to utilize a feed track on each side of the lift ring unit for double discharge, the end plate 47 would be replaced by one having the structure of end plate 254, and the lift ring would have a second set of endwise discharging compartments, for example to the left of flange 252 in Fig. 20, slanting oppositely to the first set for discharge to a second feed track. The flange 252 would then provide a central inner circumferential dividing wall.

In Figs. 24–26 is shown a ring structure for use with a ring discharge system such as that of Figs. 1–4 which utilizes the chute 93 to direct work pieces to the track. The inner face of this ring is provided with recesses arranged in a plurality of circumferential sets, with slots cut between adjacent recesses of a given set, whereby such items as nails, or long thin screws may be engaged individually for transfer to a chute discharging to a feed track. This type of ring is of advantage for elongated headed work pieces, which tend to form tangled aggregates, since the work pieces are separated before discharge to the tracks.

In Figs. 27 to 29, the machine of this invention is shown adapted to rapid discharge of a plurality of work pieces, where individual presentation thereof is not needed, for example, in feeding to a weighing device. Feeding mechanism 43 is replaced by vibrating chute adapted to disentangle nails, long screws and similar items. The annular end plate 48 bears an integral housing 290 which encloses the lower part of the end plate opening and serves to mount the lower end of vibrating chute 291 through spring plate 292. The chute inclination here is small enough to prevent work pieces from sliding unless the chute is vibrated. The upper end of the chute is secured by spring plate 293 to the bracket 294 mounted to the wall of the hopper 42 and bearing an electromagnet 295. An armature bar 296 bolted to the plate spring 292 is oscillated by the electromagnet in the manner previously described to impart an endwise vibration to the track or chute 291 to cause the work pieces to move down the chute and simultaneously to become disentangled.

When the machine is set up as shown in Figs. 27 and 28 for feeding parts to a container on a weighing scale, the control circuit for the electromagnet may include a switch effective to reduce current to the electromagnet, thereby decreasing the feed stream of work pieces to a trickle flow. Thus if the switch is operable by the movement of the arm of the weighing scale as the container on the scale approaches the desired predetermined weight, the feed is automatically reduced just before that weight is reached, so that the correct weight of pieces is more readily measured. A second switch, operable after the first when the scale arm comes to full weight position, may serve to stop the electromagnet and lift ring entirely to allow exchange of weighing containers.

The bottom of chute 291 may, as shown by the fragmentary detail in Fig. 29, be constituted of a plurality of corrugations providing channels disposed parallel to the length of the chute and the direction of feed. This type of chute bottom aids in disentangling the batch of work pieces dropped into the chute from each lift ring compartment. This chute structure, further, provides a plurality of channels aligning work pieces into as many streams, an advantage when the feeder is used with a photo-electric counting device having a photo electric cell for each channel.

The lifting ring 46, rejector mechanism 100 and track assembly 97 have been described in the structures thus far disclosed as actuated by individual driving units. In Fig. 30, however, the lift ring, rejector mechanism and feed track are all belt driven from the ring driving unit. Here, instead of the track actuating system of Fig. 1 or Fig. 13, a pulley driven eccentric member linked to the spring mounted track by a rod is used to oscillate the track, though the conveyor belt track of Figs. 16–19 could be used. Where an eccentric type drive is used to oscillate the track, it should preferably be adapted in motion characteristics to draw the track opposite the feed direction quickly and with a high acceleration as compared to the return stroke speed and acceleration. The eccentric type track actuating unit of Fig. 30 shown in detail by the sectional view of Fig. 31 as hereinafter described, produces such track motion.

The structure of the mechanism of Fig. 30 is generally similar to that of Figs. 1 to 10 and hence is not here described in detail apart from the specific points wherein it differs from the previous structures. Elements like to those in the other figures are designated by similar reference numerals. The driving unit 41 of the machine includes the motor 65 driving the triple sheave pulley 366 through belt 367, the pulley having one sheave driving the input pulley 368 of a variable speed reducing unit 369 through the belts 370, 371 and idler pulley 372, the other sheave driving the belt 373 for the rejector and track actuating units 300, 343. The variable speed reducing unit output pulley 374 drives the lifting ring through belt 59 as in the structure of Figs. 1 to 4 and the hand wheel 76 controls the variable speed reducer to vary the lift ring speed independently of the speed of the simultaneously driven rejector wheel and track actuating units. The belt 373, which drives the pulley 376 of the track actuating unit and the double sheaved pulley 377 of the rejector wheel unit, is supported on one side of frame 45 by a pair of independent pulleys in a fixed belt supporting pulley block 378 and on the other side of the frame by the pulleys of a similar pulley block 379. In order to allow regulation of belt tension, the pulley block 379 is mounted on the arm 380 pivoted on the frame and provided with means for locking the pulley in a desired position.

The rejector unit 300 comprises a stud shaft 303 fixed in a bracket 304 attached to the frame 45, the double sheaved driving pulley 377 rotatable thereon, a rejector wheel support arm 305 having one end pivoted on the stud shaft 303 and the other end bearing a stud shaft 306 on which the rejector wheel 135 rotates, the rejector wheel being driven from pulley 377 by a belt 142. Thus the wheel is pivotally mounted to swing upwards from the tracks when necessary. The clearance between track and the wheel is determined by an adjustable stop between the arm and bracket, the wheel being biased toward its lowermost position by its own weight.

The track structure, generally similar to that of Figs. 1–10, having wings or baffles, skirt shield, beveled portions and apex near the rejector wheel, is secured to upper and lower leaf springs 310, 315 by mountings such as those shown in Figs. 7 and 8 for adjustment of the slot width. However, whereas in the previous forms the lower bar reaches 101b and 102b forming the discharge portion of the track assembly, which is inclined more steeply than the upper part of the track within the enclosure 90, are integral with the upper reaches carrying the baffles, here the lower reaches 301b and 302b below the spring 315 are separated from the upper reaches 301, 302 and are fixedly mounted to the frame 45.

The eccentric type actuating unit is seen more clearly in Fig. 31. The plate 320 extending from the frame 45 mounts a base 321 having an eccentrically bored extension 322 providing a stationary shaft and an eccentric bore 323 for rotatively mounting respectively, the driving pulley 376 and eccentric shaft 324 in non-coaxial relation. A pin 325 in the pulley, pin 326 in the end of shaft 324 offset from the shaft axis and parallel to the first pin, and a connecting link or rod 327 tying the pins provide a mechanism whereby the pulley, rotating at constant rate rotates the eccentric shaft at a periodically varying rate. Snap rings 328 in the grooves on the pins hold the connecting rod 327 in place. On the end of the eccentric shaft opposite the link 327, the eccentric projection 329 with its axis coplanar, parallel and intermediate to the axes of the shaft and of the eccentric pin 326, provides a crank pin to which one end of the track connecting rod 330 is secured by a nut 331 threaded to the end of the eccentric projection. Preferably the connecting rod comprises two halves threaded one into the other and held by a lock nut to allow length adjustment. The other end of the track connecting rod 330 is pivotally secured as by the bolt 332 to an extension 333 rigidly secured to the track mounting structure on the leaf spring 310. By means of a shoulder 334 at one end and the link 327 at the other, the shaft 324 is held against axial displacement. As shown in the drawings, lubricating nipples and lubricating grooves and channels are provided in the rods 327, 330, extension 322, and pulley 376 and pins 325, 326 to lubricate the rotating surfaces.

With the described structure and with the axis of the eccentric bore 323 and hence shaft 324, displaced vertically downward from the axis of the pulley 376, the oscillatory or vibratory motion imparted to the track has the desired differences in acceleration and velocity on the forward and rearward strokes of the track. The amplitude of track vibration is of course controlled by the degree of eccentricity of the eccentric extension or crank pin 329 relative to the axis of the shaft 324, while the difference in motion characteristics of the forward and rear stroke of the track is determined primarily by the amount of displacement of the shaft axis relative to the axis of the pulley 376.

The lift ring unit described provides a structure adapted for rapid changes in lift rings for the accommodation of various type work pieces. With the trunnion-type ring mounting and removable end plates, the lift ring is readily accessible for removal and replacement by a lift ring having lifting compartments suited for a particular type of work piece. Further, the end plate mounting is such that the end plates with attached hopper or feed discharge assembly mounting structures are readily changed from one type of feed discharge track to another. Also, with the bolt and slot mounting of the end plate supporting the discharge track, the entire end plate with the discharge track mounted thereon may be rotated to some degree to provide for close positioning of the feed discharge point.

The lift ring and its enclosing structures and the feed discharge devices are such that jamming of work pieces is practically obviated. The pivoted suspension of the rejector wheel mechanism prevents jamming of work pieces or other objects beneath the wheel, while the spring suspension of the hold-down bar on the lower end of the feed discharge track allows the bar to be lifted manually to clear any jam which might occur, with the bar being returned to position by the springs without need of readjustment. Abrasive material has little opportunity to work between the lift ring and the frame and such foreign material is continually separated from the work pieces and discharged through the skirts beneath the feed tracks. By the elimination of the lift ring supporting axle usual in the prior art with its concomitant spider structures extending radially toward the lift ring, one source of possible jamming of work pieces is avoided and the entire machine is more compact than prior machines. Further, churning of work pieces by support members within the lift ring, with attendant nicking and scarring thereof, is obviated.

With the guide wings, whether separate or attached to move with the feed track, set at an inclination less than the angle of free sliding for the work pieces, greater opportunity is given for the work pieces to find the slot before dropping from the end of the wings. Further, by providing an opening between the rejector wheel and the end of the guide wings, with the intervening top edges of the feed track outwardly beveled, misaligned work pieces in great part fall off the track before reaching the rejector wheel so that a high rate of feed onto the track wings may be used without resulting in jamming at or overloading of the rejector wheel. The low angle of flare between the guide wings reduces ricocheting of the work pieces therefrom, resulting in a higher percentage of the pieces delivered by the lift ring finding the feed track slot. These several features of the track and guide structure permit a higher rate of delivery than has been hitherto possible, particularly when the feed track is oscillated with the quick withdrawal and slower return stroke motion produced by the described track actuating units. So also the feed rate for photoelectric counting is increased by virtue of the spacing developed between work pieces in passing onto the lower portion of the track having greater inclination.

I claim:

1. A feeder machine adapted to receive work pieces in bulk and to discharge the same in a feed stream, comprising a rotationally driven lift ring with axis horizontally disposed, the inner periphery of said ring being provided with spaced inwardly-extending partitions forming work piece lifting compartments, at least one end of said ring having a continuous annular end wall forming an end closure for said compartments; a housing enclosing the circumference of said ring and including a pair of end plates disposed on opposite ends of said ring and maintaining the ring against axial displacement, said housing mounting a plurality of trunnion rollers for peripherally supporting said lift ring, one of said end plates being provided with a circular shroud flange extending inward and overlying the inner periphery of said annular end wall of the lift ring; a hopper structure carried by the one of said end plates having the said shroud flange to receive bulk loaded work pieces and having an outlet opening to the interior of said lift ring to deliver work pieces to said lift ring; feed discharge means mounted on one of the said end plates, said means being adapted to receive work pieces transported from said outlet by said ring and to discharge them in a continuous feed stream; and driving means engaging the outer periphery of the ring for rotating said ring about said axis.

2. A machine as described in claim 1 wherein said driving means includes a power driven belt frictionally engaging the outer periphery of said ring whereby slippage of the belt relative to the ring is provided to avoid machine damage and jamming upon obstruction of ring motion.

3. A machine as described in claim 1 wherein the end plate mounting the said feed discharge means is mounted for limited rotation relative to the rest of the housing to provide adjustability in the locus of discharge of said feed discharge means.

4. A feeder machine as described in claim 1 having the said lift ring provided with a second continuous annular end wall forming an end closure for the several said compartments at the ring end opposite the first said annular end wall and having an adjacent end plate provided with a circular shroud flange extending inward and overlying the inner periphery of said second annular end wall to shield the adjacent end plate and end wall surfaces from entrance of debris.

5. A feeder machine as described in claim 1 having the said lift ring provided on its inner periphery with a series of spaced slanted lifting blades as the said partitions dividing the ring into said compartments and with but one continuous annular end wall adjacent the hopper supporting end plate, the ends of the compartments opposite said end wall being open; and having the other end plate formed to provide an end closure portion for the open ends of moving compartments at the ascending position of the said lift ring, said closure portion terminating above said feed discharge means; the direction of slant of said blades being such as to slope down to the last said end plate when in the ascending position of said lift ring, whereby said compartments may discharge through said open ends on passing above the said end closure portion.

6. A machine as described in claim 1 wherein said discharge means extends parallel to the plane of rotation of said lift ring and has an upper longitudinal portion in close proximity to the end plate on which the discharge means is mounted; and wherein the last said end plate is provided with an opening of vertical dimension substantially the inner diameter of said ring, and guard means preventing work pieces projecting from said ring from engaging the under side of said discharge means provided by a plate edge formation at said opening adjacent the ascending portion of said ring receding inwardly relative to radii of said ring from the bottom of the opening to a point above said upper longitudinal portion.

7. A machine as described in claim 1 with guard means provided at the opening of said hopper by an edge formation adjacent the ascending portion of said ring receding inwardly relative to radii of said ring from the bottom to the top of the opening for preventing work pieces projecting from said ring from engagement under the upper edge of said hopper opening.

8. A feeder machine adapted to receive work pieces in bulk and to discharge the same in a feed stream, comprising a rotationally driven lift ring with axis horizontally disposed, the inner periphery of said ring being provided with spaced inwardly extending partitions forming work piece lifting compartments; a housing including a pair of end plates disposed on opposite ends of said ring and maintaining the ring against axial displacement, said housing enclosing the circumference of said ring and mounting a plurality of trunnion rollers for peripherally supporting said lift ring; a hopper structure carried by one of said end plates to receive bulk loaded work pieces and having an outlet to the interior of said lift ring to deliver work pieces to said lift ring; feed discharge means mounted on the other said end plate and extending parallel to the plane of rotation of said lift ring, said discharge means having an upper portion in close proximity to said other end plate and being adapted to receive work pieces transported from said outlet by said ring and to discharge them in a continuous feed stream, said other end plate having an opening of vertical dimension substantially the inner diameter of said lift ring, guard means on said other end plate providing for said opening an edge adjacent the ascending portion of said ring curving inwardly relative to radii of the ring from the bottom of said opening to a point at least the height of the said upper portion of the discharge means proximate thereto, whereby work pieces projecting from said ring are displaced back to the ring to prevent jamming engagement with said discharge means; and driving means engaging the outer periphery of the ring for rotating said ring about said axis.

9. A feeder machine adapted to receive work pieces in bulk and to discharge the same in a feed stream, comprising a rotationally driven lift ring with axis horizontally disposed, the inner periphery of said ring being provided with spaced inwardly extending partitions forming work piece lifting compartments; a housing including a pair of end plates disposed on opposite ends of said ring and maintaining the ring against axial displacement, said housing enclosing the circumference of said ring and mounting a plurality of trunnion rollers for peripherally supporting said lift ring; a hopper structure carried by one end plate to receive bulk loaded work pieces and having a bottom outlet opening through said one end plate to the interior of said lift ring to deliver work pieces to said lift ring; guard means at said outlet comprising an edge formation bounding said opening in the region adjacent the ascending portion of said ring and curving inwardly relative to radii of said ring from bottom to top of the opening, for displacing projecting work pieces back into the ring to prevent work piece engagement under the upper boundary of said opening; feed discharge means mounted on one of the said end plates, said discharge means being adapted to receive work pieces transported from said outlet by said ring and to discharge them in a continuous feed stream; and driving means engaging the outer periphery of the ring for rotating said ring about said axis.

References Cited in the file of this patent

UNITED STATES PATENTS

| | | |
|---|---|---|
| 459,698 | Buffum | Sept. 15, 1891 |
| 973,921 | Dodge | Oct. 25, 1910 |
| 1,086,429 | Wetmore | Feb. 10, 1914 |
| 1,104,029 | Weiss | July 21, 1914 |
| 1,254,157 | Perkins | Jan. 22, 1918 |
| 1,326,925 | Goldberg | Jan. 6, 1920 |
| 1,476,064 | Eynon | Dec. 4, 1923 |
| 1,600,238 | McCain | Sept. 21, 1926 |
| 1,637,401 | Weyandt | Aug. 2, 1927 |
| 1,687,134 | Lynch et al. | Oct. 9, 1928 |
| 1,764,607 | Cook | June 17, 1930 |
| 1,784,124 | Wilcox | Dec. 9, 1930 |
| 1,858,328 | Heymann et al. | May 17, 1932 |
| 2,015,892 | Greenlaw | Oct. 1, 1935 |
| 2,203,287 | Smith | June 4, 1940 |
| 2,337,667 | Kuehlman | Dec. 28, 1943 |
| 2,531,099 | Anderson | Nov. 21, 1950 |
| 2,549,322 | McKinsey | Apr. 17, 1951 |
| 2,613,374 | Gora | Oct. 14, 1952 |
| 2,621,824 | Gookin | Dec. 16, 1952 |
| 2,636,319 | Knight | Apr. 28, 1953 |
| 2,667,797 | Buenger | Feb. 2, 1954 |
| 2,683,487 | Conner | July 13, 1954 |
| 2,696,285 | Zenlea | Dec. 7, 1954 |